US012797865B2

(12) United States Patent
Flynn et al.

(10) Patent No.: US 12,797,865 B2
(45) **Date of Patent: *Nov. 17, 2026**

(54) PROCESS FOR DRY BENEFICIATION OF FINE AND VERY FINE IRON ORE BY SIZE AND ELECTROSTATIC SEGREGATION

(71) Applicant: ST Equipment & Technology LLC, Needham, MA (US)

(72) Inventors: Kyle P. Flynn, Moseley, VA (US); Abhishek Gupta, Cambridge, MA (US); Lucas Rojas Mendoza, Watertown, MA (US)

(73) Assignee: ST Equipment & Technology LLC, Needham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/732,044

(22) Filed: Jun. 3, 2024

(65) Prior Publication Data

US 2024/0316573 A1 Sep. 26, 2024

Related U.S. Application Data

(63) Continuation of application No. 18/012,020, filed as application No. PCT/US2021/038492 on Jun. 22, 2021, now Pat. No. 11,998,930.

(Continued)

(51) Int. Cl.
*B03C 7/02* (2006.01)
*B03C 7/00* (2006.01)
(Continued)

(52) U.S. Cl.
CPC ................ *B03C 7/02* (2013.01); *B03C 7/003* (2013.01); *B03C 7/08* (2013.01); *C22B 1/00* (2013.01)

(58) Field of Classification Search
CPC .. B03C 7/02; B03C 7/003; B03C 7/08; B03C 7/006; C22B 1/00; Y02P 10/20
See application file for complete search history.

(56) References Cited

U.S. PATENT DOCUMENTS

| | | | |
|---|---|---|---|
| 1,100,896 | A | 6/1914 | Lokey |
| 1,110,896 | A | 9/1914 | Comstock |

(Continued)

FOREIGN PATENT DOCUMENTS

| | | | |
|---|---|---|---|
| CA | 2219133 | A1 | 10/1996 |
| CA | 2462033 | A1 | 4/2003 |

(Continued)

OTHER PUBLICATIONS

Klinzing, G.E., et al. (1997). Pneumatic Conveying of Solids: A Theoretical and Practical Approach (2nd Ed.). Chapman and Hall. Section 3.5, pp. 78-81.

(Continued)

*Primary Examiner* — Michael Mccullough
*Assistant Examiner* — Kalyanavenkateshware Kumar
(74) *Attorney, Agent, or Firm* — Lando & Anastasi, LLP

(57) ABSTRACT

Systems and methods for the beneficiation of fine and very fine particles of iron ore are disclosed. The system includes a first triboelectric electrostatic belt-type separator (BSS) which receives and processes a stream of particles with a median particle size (d50) less than 75 microns to generate an iron rich concentrate. The system and method is water-free and carried out in a totally dry metallurgical route. The system also includes at least one air classification device that receives and processes a feed stream of particles to provide the stream of particles with a median particle size (d50) that is less than 75 microns. The system may also include a dryer and de-agglomeration system that receives a feed stream of (Continued)

particles and processes the feed stream of particles to provide the particle stream with a moisture of less than 2%.

27 Claims, 5 Drawing Sheets

Related U.S. Application Data

(60) Provisional application No. 63/042,261, filed on Jun. 22, 2020.

(51) Int. Cl.
*B03C 7/08* (2006.01)
*C22B 1/00* (2006.01)

(56) References Cited

U.S. PATENT DOCUMENTS

| | | | | |
|---|---|---|---|---|
| 1,222,305 | A | 4/1917 | Kraus | |
| 1,355,477 | A | 10/1920 | Howell | |
| 1,931,322 | A | 10/1933 | Kepler | |
| 2,689,648 | A | 9/1954 | Maestas | |
| 2,758,666 | A | 8/1956 | Prentiss | |
| 2,776,725 | A | 1/1957 | Wood | |
| 2,847,124 | A | 8/1958 | Brastad | |
| 2,889,042 | A | 6/1959 | Le Baron | |
| 3,022,889 | A | 2/1962 | Le Baron et al. | |
| 3,096,277 | A | 7/1963 | Maestas | |
| 3,140,714 | A | 7/1964 | Murphy, Jr. et al. | |
| 3,247,960 | A | 4/1966 | Brastad | |
| 3,384,692 | A | 5/1968 | Galt et al. | |
| 3,449,837 | A | 6/1969 | Giddings | |
| 3,449,938 | A | 6/1969 | Giddings | |
| 3,493,109 | A | 2/1970 | Carta et al. | |
| 3,635,340 | A | 1/1972 | Dunn | |
| 3,664,939 | A | 5/1972 | Luner et al. | |
| 3,720,312 | A | 3/1973 | Shook et al. | |
| 3,754,890 | A * | 8/1973 | Fitch | C21B 13/08 75/10.67 |
| 3,941,685 | A | 3/1976 | Singewald et al. | |
| 3,988,410 | A | 10/1976 | Larsen et al. | |
| 4,122,002 | A | 10/1978 | Hauskins, Jr. | |
| 4,122,022 | A | 10/1978 | MacKenzie et al. | |
| 4,137,156 | A | 1/1979 | Morey et al. | |
| 4,172,028 | A | 10/1979 | Dunn | |
| 4,211,594 | A | 7/1980 | Freitag et al. | |
| 4,274,947 | A | 6/1981 | Beeckmans et al. | |
| 4,297,207 | A | 10/1981 | Singewald et al. | |
| 4,298,518 | A | 11/1981 | Ohmura et al. | |
| 4,302,245 | A | 11/1981 | Winters | |
| 4,321,189 | A | 3/1982 | Ohshita et al. | |
| 4,358,358 | A | 11/1982 | Rhodes | |
| 4,430,146 | A | 2/1984 | Johnson | |
| 4,440,638 | A | 4/1984 | Judy et al. | |
| 4,451,357 | A | 5/1984 | LaVigne | |
| 4,476,004 | A | 10/1984 | Pohl | |
| 4,482,351 | A | 11/1984 | Kitazawa et al. | |
| 4,517,078 | A | 5/1985 | Inculet et al. | |
| 4,532,098 | A | 7/1985 | Campbell et al. | |
| 4,533,447 | A | 8/1985 | Meldon | |
| 4,650,567 | A | 3/1987 | McGarry et al. | |
| 4,701,487 | A | 10/1987 | Hakim | |
| 4,767,506 | A | 8/1988 | Fricke | |
| 4,839,032 | A * | 6/1989 | Whitlock | B03C 7/00 209/127.1 |
| 4,874,507 | A | 10/1989 | Whitlock | |
| 5,006,226 | A | 4/1991 | Burt, Jr. | |
| 5,135,974 | A | 8/1992 | Moore | |
| 5,188,873 | A | 2/1993 | Delannoy | |
| 5,251,762 | A | 10/1993 | Taylor et al. | |
| 5,299,692 | A | 4/1994 | Nelson et al. | |
| 5,342,250 | A | 8/1994 | Sanders | |
| 5,356,682 | A | 10/1994 | Stewart et al. | |
| 5,358,119 | A | 10/1994 | Stahl et al. | |
| 5,375,721 | A | 12/1994 | LaVigne | |
| 5,447,588 | A | 9/1995 | Merz et al. | |
| 5,449,390 | A | 9/1995 | Duncan et al. | |
| 5,470,554 | A | 11/1995 | Schmidt et al. | |
| 5,484,061 | A | 1/1996 | Dunn | |
| 5,513,755 | A | 5/1996 | Heavilon et al. | |
| 5,562,755 | A | 10/1996 | Fricke et al. | |
| 5,562,796 | A | 10/1996 | Ertel | |
| 5,698,358 | A | 12/1997 | Yu | |
| 5,819,946 | A | 10/1998 | Whitlock et al. | |
| 5,829,598 | A | 11/1998 | Whitlock | |
| 5,837,115 | A | 11/1998 | Austin et al. | |
| 5,857,561 | A | 1/1999 | Hardman et al. | |
| 5,904,253 | A | 5/1999 | Cerullo et al. | |
| 5,934,449 | A | 8/1999 | Dolan | |
| 5,944,875 | A * | 8/1999 | Stencel | B03C 7/006 209/127.4 |
| 6,066,194 | A | 5/2000 | Hugghins et al. | |
| 6,074,458 | A | 6/2000 | Bittner et al. | |
| 6,320,148 | B1 | 11/2001 | Yoon et al. | |
| 6,365,856 | B1 | 4/2002 | Whitelaw | |
| 6,375,875 | B1 | 4/2002 | Paulauskas et al. | |
| 6,942,752 | B2 | 9/2005 | Whitlock et al. | |
| 7,467,709 | B2 | 12/2008 | Whitlock et al. | |
| 8,552,326 | B2 | 10/2013 | MacKay et al. | |
| 9,393,573 | B2 | 7/2016 | Flynn et al. | |
| 9,764,332 | B2 | 9/2017 | Bush et al. | |
| 10,207,275 | B2 | 2/2019 | Donda | |
| 2006/0249270 | A1 | 11/2006 | Alves et al. | |
| 2011/0289923 | A1 | 12/2011 | Bittner et al. | |
| 2012/0059508 | A1 | 3/2012 | MacKay et al. | |
| 2015/0076037 | A1 | 3/2015 | Yamamoto | |
| 2015/0140185 | A1 | 5/2015 | Rajabzadeh et al. | |
| 2015/0306605 | A1 | 10/2015 | Flynn et al. | |
| 2016/0143346 | A1 | 5/2016 | Pandya et al. | |
| 2016/0310957 | A1 | 10/2016 | Barakat et al. | |
| 2017/0094899 | A1 | 4/2017 | Webermann et al. | |

FOREIGN PATENT DOCUMENTS

| | | | |
|---|---|---|---|
| CN | 1243457 | A | 2/2000 |
| CN | 102239014 | A | 11/2011 |
| CN | 202460846 | U | 10/2012 |
| CN | 103079707 | A | 5/2013 |
| CN | 104907255 | A | 9/2015 |
| DE | 0705007 | C | 4/1941 |
| DE | 1758748 | C3 | 3/1978 |
| DE | 3527599 | A1 | 2/1987 |
| DE | 4439889 | C1 | 8/1996 |
| DE | 19901743 | A1 | 7/2000 |
| DE | 10351180 | B3 | 1/2005 |
| DE | 202005001889 | U1 | 8/2005 |
| EP | 0080729 | A1 | 6/1983 |
| EP | 0109828 | A1 | 5/1984 |
| EP | 0121921 | A1 | 10/1984 |
| EP | 0499138 | A2 | 8/1992 |
| EP | 0524176 | A1 | 1/1993 |
| EP | 0613724 | A2 | 9/1994 |
| EP | 1007215 | B1 | 8/2002 |
| EP | 1908355 | A1 | 4/2008 |
| FR | 940389 | A | 12/1948 |
| FR | 1574621 | A | 7/1969 |
| GB | 1039898 | A | 8/1966 |
| GB | 2001357 | A | 1/1979 |
| GB | 2013303 | A | 8/1979 |
| GB | 2139316 | A | 11/1984 |
| JP | 10-263963 | | 10/1998 |
| JP | 2001-503283 | A | 3/2001 |
| JP | 2001-113202 | A | 4/2001 |
| JP | 2002-177820 | A | 6/2002 |
| JP | 2003-126832 | A | 5/2003 |
| JP | 2007-046805 | A | 2/2007 |
| JP | 4889268 | B2 | 3/2012 |
| JP | 4889269 | B2 | 3/2012 |
| RU | 1787555 | C | 1/1993 |
| RU | 2152263 | C1 | 7/2000 |
| RU | 2163168 | C2 | 2/2001 |
| RU | 49588 | U1 | 11/2005 |
| RU | 49842 | U1 | 12/2005 |

(56) References Cited

FOREIGN PATENT DOCUMENTS

| | | | |
|---|---|---|---|
| RU | 2005129101 | A | 1/2006 |
| RU | 2295393 | C2 | 3/2007 |
| RU | 2309847 | C2 | 11/2007 |
| RU | 2577869 | C2 | 3/2016 |
| SU | 187678 | A1 | 10/1966 |
| SU | 0495088 | A1 | 12/1975 |
| SU | 0498042 | A1 | 1/1976 |
| SU | 602225 | A1 | 4/1978 |
| SU | 975093 | A1 | 11/1982 |
| SU | 1007735 | A1 | 3/1983 |
| SU | 1196033 | A1 | 12/1985 |
| SU | 1475720 | A1 | 4/1989 |
| WO | 8707532 | A1 | 12/1987 |
| WO | 8909092 | A1 | 10/1989 |
| WO | 9627635 | A1 | 9/1996 |
| WO | 9633809 | A1 | 10/1996 |
| WO | 97/20633 | A1 | 6/1997 |
| WO | 2007014402 | A1 | 2/2007 |
| WO | 2009/104566 | A1 | 8/2009 |
| WO | 2012031080 | A1 | 3/2012 |
| WO | 2019046234 | A1 | 3/2019 |
| WO | 2020014743 | A1 | 1/2020 |

OTHER PUBLICATIONS

Search Report in corresponding Federal Service for Intellectual Property (RU) Patent Application No. 2020112472 dated Dec. 24, 2021.

Office Action in corresponding Chinese Patent Application No. 2018800647624 dated Dec. 30, 2022.

International Search Report and Written Opinion for PCT/US2021/038492 dated Oct. 15, 2021.

Notification of Transmittal of the International search Report and the Written Opinion of the International Searching Authority, or the Declaration dated Jan. 19, 2012 for PCT/US2011/050148.

SME Mineral Processing Handbook—Norman L. Weiss, Pub. by Society of Mining Engineers of the American Institute of Mining, Metallurgical, andPetroleum Engineers, Inc. 1985, pp. 6-34.

R.J. Adamson, and K.V.I.S. Kaler "An Automated Stream Centered Dielectrophoretic System", Conference Record of Record of the 1986 IEEE Industry Applications Society Annual Meeting Part II, Sep. 28-Oct. 3, 1986 1986, IEEE Catalog No. 86CH2272-3 pp. 1350-1354.

Ausimont USA, Inc., "When Plastic Parts are Part Polymist, They're Better Parts" brochure (1985-1995).

Lonza Plastic Additive Selection Guide, brochure BP, Sep. 1994.

Plastics Compounding magazine, 17/(4), Jul./Aug. 1994, p. 22.

Synthetic Product Company, Technical data sheet on "Petrac Slip-Pure" TD-003, rev Feb. 10, 1994.

Chemie Linz production brochure on "Melamine Cyanurate additive for Plastics".

Akzo Nobel "Polymer Additives", brochure, Bulletin 94-25, 1994.

Lonza spec sheet on Acrawax C (ethylene bisstearamide), revised Mar. 1993.

Du Pont Kevlar Aramid Fiber Technical Guide brochure,, p. III-1 H-46267, Dec. 1992.

Du Pont Teflon Fluroadditive brochure 44662, undated (but issued between 1988 and 1994).

Du Pont "Guide to processing Kevlar Aramid Fiber and pulp for friction products" brochure, p. 1 E-65333, Jun. 1984.

John E. Theberge, Jane Crosby and Marygail Hutchins "Greater Property Uniormity from Aramid-Reinforced Thermoplastics, Reprint from Machine Design, Feb. 7, 1985—Reinforceds Thermoplastics".

Du Pont Zytel-Kevlar SFC Short Fibert Composite Brochure H-42527, Feb. 1994.

Hoechst Plastics Hostalen GUR brochure, p. 16 HKR 112 Feb. 1981.

RTP Corp, Winona, MN brochure "Wear Resistant Thermoplastics" (1991).

LNP Corporation, Malvern, PA, "Lubricomp Internally Lubricated Reinforced Thermoplastics and Fluoropolymer Composites," Bulletin 254-998, undated (but probably from 1985-1990).

R.J. Gruber & P.C. Julien, "Dry Toner Technology", A.S. Diamond, ed., Handbook of Imaging Materials, Marcel Dekker, 1991.

A.R. Savkoor & T.J. Rutyer, "Experimental investigation of the effect of electrical potential on adhesive friction of elastomers", Advances in Polymer Friction & Wear, ed., L-H Lee, (Polymer Science & Technology Symposium Series, vol. 5B, PlenumPress, NY, 1974.

B.J. Briscoe, C.M. Pooley and D. Tabor, in "Friction & Wear of some polymers in unlubicated sliding", Advances in Polymer Friction & Wear, ed., L-H Lee, (Polymer Science & Technology Symposium Series, vol. 5B, Plenum Press, NY, 1974.

Article in Uhlmann's Encyclopedia of Industrial Chemistry, 1985, vol. B1, pp. 9-2 to 9-26.

Barry Arkles et al., "Wear Characteristics of Fluoropolymer Composites", Liquid Nitrogen Processing Corporation.

M.O.W. Richardson "Chemical and Physical EffEcts Associaed with Polymer Tribology", Department of Materials Technology, Loughborough University of Technology, Loughborough, Leicestershire, (1973).

D.C. Evans and J.K. Lancaster "The Wear of Polymers", Treatise on Materials Science and Technology, vol. 13 (1979).

Ku/Liepinds, "Electrical Properties of Polymers", Hanser Publishers, (1978).

A.R. Blythe, "Electrical Properties of Polymers", Cambridge Solid State Science Series (1979).

L.B. Schein, ElectrophotOGraphy and Development Physics, Second Edition, Springer-Verlag vol. 14 (1988, 1992).

Lieng-Huange Lee "Polymer Wear and its Control", ACS Symposium Series 287 (1985).

Donald A. Seanor "Electrical Properties of Polymers", Academic Press, Inc. (1982).

BASF Plastic, Ultramid Nylon Resins brochure, p. 18 (1991).

Atochem Inc., Polymers Division, 'Facts about Rilsan p. 10 (1986).

Gachter and Muller, Plastics Additive Handbook, 3rd Edition, Haser, p. 632 (1990).

Dow Corning Corp., "A Guide to Dow Corning Products", p. 31 (1977).

Whitlock, D.R., "Electrostatic Separation of Unburned Carbon from Fly Ash," Proceedings Tenth Int. Ash Use Symposium, vol. 2, 1993, pp. 70-1-70-2, XP002063618.

Adamson, R.J. and Kaler, K.V.I.S., "An Automated Stream Centered Dielectrophoretic System," Conference Record of the 1986 IEEE Industry Applications Society Annual Meeting Part II, Sep. 28-Oct. 3, 1986, IEEE Catalog No. 86CH2272-3, pp. 1350-1354.

J.D. Bittner et al: "Triboelectric Belt Separator for Beneficiation of Fine Minerals", Procedia Engineering, vol. 83, Jan. 2014 (Jan. 2014), pp. 122-129.

International Search Report and Written Opinion from PCTUS2016017394 mailed Jun. 27, 2016.

Official Action from F1-13N96457 mailed Feb. 22, 2017.

Office Action from Application No. 2809268 dated May 18, 2017.

International Search Report and Written Opinion in International Patent Application No. PCT/US2020/026560 dated Jul. 13, 2020.

Wood, S.G. et al., "Seed Lipid Content and Fatty Acid Composition of Three Quinoa Cultivars", Journal of Food Composition and Analysis, vol. 6, No. 1, pp. 41-44 (1993).

International Search Report and Written Opinion in application No. PCT/US2018/048241 dated Feb. 14, 2019.

International Search Report and Written Opinion in application No. PCT/US2020/032098 dated Aug. 3, 2020.

Klinzing, G.E. et al. (1997). Pneumatic Conveying of Solids: A Theoretical and Practical Approach (2nd Ed.). Chapman & Hall. Section 3.5, pp. 78-81.

Tabtabaei, S. et al. (2016). "Solvent-free production of protein-enriched fractions from navy bean flour using a triboelectrification-based approach," Journal of Food Engineering, vol. 174, pp. 21-28.

Examination Report in corresponding Indian Patent Application No. 202017013468 dated Oct. 27, 2021.

Search Report in corresponding RU Patent Application No. 2020112472 dated Dec. 24, 2021.

(56) References Cited

OTHER PUBLICATIONS

Office Action and Search Report in corresponding Chinese Patent Application No. 201880064762.4 dated Dec. 30, 2021.
Second Office Action in corresponding Chinese Application No. 202180041299.3 dated Feb. 9, 2026.

* cited by examiner

PROCESS FOR DRY BENEFICIATION OF FINE AND VERY FINE IRON ORE BY SIZE AND ELECTROSTATIC SEGREGATION

CROSS-REFERENCE TO RELATED APPLICATIONS

This application is a Continuation of application Ser. No. 18/012,020 filed Dec. 22, 2022, which claims priority to U.S. National Phase Application under 35 U.S.C. § 371 of International Application No. PCT/US2021/038492, filed Jun. 22, 2021, which claims priority to U.S. Provisional Application 63/042,261 filed on Jun. 22, 2020, the entire contents of each of which is hereby incorporated by reference.

BACKGROUND

Field of Invention

The present invention relates to a process of drying, de-agglomeration, air classification and electrostatic separation for water-free beneficiation of iron ores.

Discussion of Related Art

U.S. Pat. No. 10,207,275 describes a system of dry grinding and dry desliming of iron ore to remove naturally occurring ultrafine particles, and ultrafine particles generated during the grinding process. These particles are described as being 90%<37 μm to 90%<5 μm. However, these particles are lost in the circuit as tailings, and therefore represent a loss of iron recovery.

U.S. Pat. No. 9,327,292 uses a system comprised of a dryer, a series of air classifiers and magnetic separators to recover iron ore from moderately coarse to fine, low-grade iron ores. The separator system is shown to be effective on particles below 150 microns, but no data on selectivity is presented individually for very fine fractions, such as those below 20 microns. The inventors acknowledge that for the fraction lower than 150 micron the separation is more challenging due to the dragging of non-magnetic fines along with the magnetic fraction caused by the magnetic field lines (Eddy Currents). The inventors describe that their invention provides a high-intensity magnetic roll equipment exclusively for separating iron oxide fines of size 150 microns to 0 microns. However, the system requires particle size segregation (or particle size fractionation), desliming and multiple passes of operation at different magnetic intensity levels to achieve separation on material with a particle size less than 45 micron.

U.S. Pat. No. 8,757,390 describes a magnetic roller separator device for dry particles, in which the magnetic roll is covered by a non-magnetic plastic belt. As the roll rotates, the belt detaches from the roll and causes the magnetic particles to detach from the belt and fall by gravity and centrifugal force into the appropriate hopper. The system is described as being effective for particles between 1,000 microns and 50 microns.

U.S. Pat. No. 7,041,925 describes an electrostatic separation device for particulate mixtures that is based on conductivity differences, by which particles are charged and then contacted by a conductive surface, a rotating drum roll that is grounded. The particles that are conductive (ie—iron ore) are neutralized by contact with the drum roll, and then are no longer attracted to the roll by electrostatic forces. The particles that are non-conductive, ie—silicates, maintain their electrical charge and are pinned to the rotating drum.

U.S. Pat. No. 6,723,938 describes a conductive induction charging based electrostatic separator featuring an electrode arrangement located above a conductive drum, whereby conductive particles contact the drum, transfer electrical charge to or from the drum, and are lifted from the surface of the roller.

U.S. Pat. No. 3,337,328 uses electrostatic separation of iron oxides from silica as part of a large flowsheet containing crushing, grinding, gravity separation or flotation or magnetic separation followed by electrostatic separation to generate high grade iron ore. However, the electrostatic process described is only suitable for coarse material, with a minimum size of 0.003 inches or 75 micron. The fines are instead treated by froth flotation.

U.S. Pat. Nos. 2,754,965 and 2,805,770 describe processes for beneficiation of multi-component ores using electrostatic techniques, with specific focus on phosphate rock. The methods do not describe beneficiation of iron ores and are limited to particle sizes that are larger than 200 mesh.

U.S. Pat. No. 2,881,916 describes drying of non-metallic ores prior to electrostatic separation, again with a focus on phosphate ores. The preparation for the electrostatic separation process describes that ores preferably must have a particle size within the range of −24 mesh to +100 mesh. Specifically, the invention seeks to limit fines generated during drying, which are known to limit effective electrostatic separations.

A belt separator system (BSS) is disclosed in commonly-owned U.S. Pat. Nos. 4,839,032 and 4,874,507. Commonly-owned U.S. Pat. No. 5,904,253 describes an improved belt geometry for a BSS and claims a system for processing iron bearing minerals from glass-making raw materials and ceramic precursors.

SUMMARY OF INVENTION

Aspects and embodiments of the disclosure relate to a process of drying, de-agglomeration, air classification and electrostatic separation for water-free beneficiation of fine and very fine iron ores. Aspects and embodiments of the disclosure are directed to a process to segregate iron ore by particle size, utilizing air classification, and subsequently perform upgrading of the iron minerals by electrostatic separation on one or more of the size fractions, to generate an iron ore concentrate from fine and very fine iron ore in a completely dry and water free process. The disclosure aims to enable the processing of fine and very fine iron ores, such as ores that are finer than 75 microns, e.g. less than 70 microns, less than 50 microns, less than 25 microns and even below 10 microns, that are not recoverable by conventional technologies, wet or dry, and would otherwise become wastes or tailings. Furthermore, an advantage of the disclosure is that the processing is carried out in an entirely dry method without water, therefore the final wastes will be dry and stackable, unlike traditional wet tailings. The present invention is suitable on iron ores containing magnetic minerals, such as magnetite and hematite, but also non-magnetic minerals such as goethite and limonite. In some non-limiting embodiments, the iron ore may include one or more of hematite, goethite and magnetite, in varying proportions. In at least some non-limiting embodiments, the iron ore is associated with gangue minerals selected from the group including but not limited to: quartz, kaolinite, gibbsite and carbonates. The iron ore may include additional iron minerals such as siderite and/or lepidocrocite.

The present invention is suitable for generating sellable iron ore concentrates of 58% Fe or higher, including concentrate above 65% Fe.

One embodiment of the invention comprises an agitated air-swept dryer to dry and de-agglomerate particles, followed by one or more air classifiers or air cyclones to segregate low grade iron ore into two or more particle size fractions. In this embodiment, the fine fraction(s) of the air classifier(s) is processed by a belt type electrostatic separator system (BSS), to generate a high-grade iron ore concentrate. The term "fine fraction" may be used throughout to embody particles classified as fine and/or very fine as defined herein.

In another embodiment, both the fine and coarser fractions of the air classifier(s) of the iron ore concentrate are processed by the BSS as separate streams, to maximize the efficiency of the BSS operation.

These and other features and benefits of the present invention will be more particularly understood from the following detailed description.

BRIEF DESCRIPTION OF THE DRAWINGS

The foregoing and other advantages of the application will be more fully appreciated with reference to the following drawings in which.

DETAILED DESCRIPTION

Figure 1:
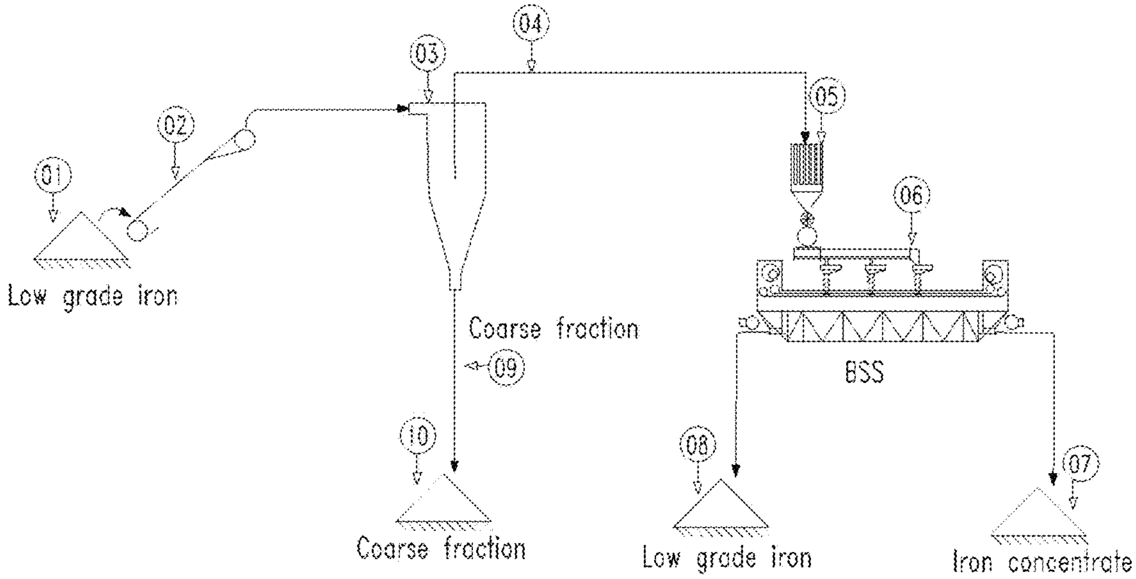
FIG. 1 illustrates a diagram of an embodiment of a system for drying, de-agglomerating, particle size segregation and belt separation of fine and/or very fine iron ores.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Water free methods of iron ore beneficiation include magnetic separation and electrostatic separation. Both dry magnetic separation systems and traditional electrostatic separation systems are limited in their ability to process fine and very fine particles, fine particles here defined as particles which are majority (d50) smaller than 75 μm and very fine particles here defined as particles which are majority (d50) smaller than 25 μm and in some cases mostly smaller than 10 μm. A water-free processing method to recover iron ore from fines would be highly advantageous to the iron ore industry, as such material is often processing wastes, which are currently stored in large wet tailings impoundments at significant cost and at risk of failure, with potential catastrophic results to human life and the environment.

Such a process to economically process iron ore fines would need to be highly suited for processing fine and very fine particles, as the granulometric distribution of the material in iron waste basins ranges from a d50 of 60 microns to 10 microns, meaning that a significant fraction of the material is smaller than 75 microns and less than 25 microns. Such very fine particles are known to be difficult or impossible to process with existing technologies such as flotation or magnetic separation. Froth flotation, a wet processing method, is not advantageous for processing very fine particles as separation selectivity and reagent consumption are deleteriously impacted by the presence of slimes and very fine particles. Methods of wet and dry desliming of ores have been employed, however, these particles are lost in the circuit as tailings, and therefore represent both a loss of iron recovery and a future environmental liability.

Magnetic separators, operating both wet and dry are frequently utilized in industrial scale iron ore processing for coarse to moderately fine particles. Wet magnetic separators have been successfully employed for fine particles, but have the disadvantage of generating a wet tailings, requiring large volumes of water, and subsequent drying of the final concentrate. The limitation of dry magnetic separators on fine particles are well understood due to the effects of air currents, particle to particle adhesion, and particle to rotor adhesion. Fine particles are highly influenced by the movement of air currents, and thus it is not practical to sort fine particles by dry magnetic processing methods in which the particles are required to follow a trajectory imparted by the movement of the magnetic separator belt. Moreover, for such fine particles the magnetic force is higher than the centrifugal force leading to non-bearing Fe iron particles being conducted to the magnetic zone. In addition to these disadvantages, magnetic systems produce a mixed fraction, ie—a middlings fraction, which must then be either recycled to the original feed, recycled as tailings or blended with the product, which reduces final concentrate grade. Magnetic roll separator systems are not effective for fine particles, due to the limitations of air currents and particle-particle adhesion.

Electrostatic separators can be classified by the method of charging employed. The three basic types of electrostatic separators include; (1) high tension roll (HTR) ionised field separators, (2) electrostatic plate (ESP) and screen static (ESS) field separators and (3) triboelectric separators, including belt separator systems (BSS).

High tension roll (HRT) systems are unsuitable for processing fine particles, as fine particles are influenced by air currents and are therefore not suitable for sorting by any means which relies on imparted momentum. In addition, such devices are inherently limited in the rates of fine particles they are able to process due to the requirement that each individual particle contact the drum roll. As particle size decreases, the surface area of the particles per unit of weight increases dramatically, thus reducing the effective processing rate of such devices, and making them unsuitable for processing fine particles at commercially relevant rates.

In addition to these operational limitations, the fine particles that are present in the non-conducting fraction are difficult to remove from the rolls once attached, due to the strong electrostatic force relative to the mass of the particles. The limitations of such devices on fine particles include fine particles adhere to the surface of the drum, are challenging to remove and degrade the ability of the conductive particles to make contact with the drum. Therefore, such separators are not suitable for very fine ores. Electrostatic separation (ES) of iron ore has been utilized only in relatively limited commercial application, and only with particles which are relatively coarse, larger than 75 micron.

Belt separator systems (BSS) are used to separate the constituents of particle mixtures based on the charging of the different constituents by surface contact (i.e. the triboelectric effect). BSS offer advantages over HRT, ESP and ESS electrostatic separators including free fall or drum roll separators as they are ideally suited to processing fine materials, including mixtures of particles that contain significant amounts of material less than 75 μm, less than 50 μm, less than 25 μm and even less than 10 μm. However, BSS are limited in their ability to process material streams that contain wide ranges of particle size distributions and are high in moisture. Furthermore, BSS require free flowing and completely liberated particles, which is not readily achievable when processing wastes. BSS rely upon tribo-charging or contact charging, where mineral ores transfer electrical charge between other components of the mixture, due to differences in work function. Therefore, BSS are most efficient when the particle mixture contains a minimum of major mineral constituents. For these reasons, BSS alone are not conventionally considered suitable for processing fine iron ores or fine iron tailings unless specialized pre-processing techniques are utilized.

BSS have previously been employed for rejecting iron bearing minerals such as pyrites from glass-making raw materials and ceramic precursors, for the purposes of improving color and whiteness of the ceramic finished products. This system did not contain the preprocessing steps of de-agglomeration drying and pneumatic particle size fractionation to suitably prepare fine iron bearing minerals for electrostatic processing. Such a system was not demonstrated to be effective for processing iron bearing minerals from iron ore tailings or wastes, in which the desire is to generate sellable iron ore products with 58% or higher Fe grade. BSS are most efficient with a limited number of major mineral species present in the feed mixture, or when major mineral species contained in the feed mixture share similar tribocharging and work function properties. This is fundamental to the operation, due to the necessity for the minerals species to transfer electrical charge to each other during tribocharging. The presence of clays or slimes mixed with fine iron ores results in degraded performance for BSS. Aspects and embodiments of this disclosure are directed to eliminating this limitation by segregating clay minerals by particle size using pneumatic size segregation, to allow for selective segregation of fine iron from non-clay gangue minerals.

Aspect and embodiments of this disclosure are directed to a system of processing fine and very fine iron ores in a completely water-free method, as illustrated in FIG. 1. The low-grade iron ore is introduced to a dynamic air classification system, or static cyclone system (03) that performs a segregation based on particle size. The fine fraction of the air classifier (which may be comprised of fine and/or very fine iron ore particles) (04) is fed into an electrostatic separation system (06), and specifically a belt separation system (BSS), where the ore is sorted into an iron concentrate fraction (07) and a waste faction (08) which is dry and stackable. The coarser fraction (09) from the dynamic air classification system, or air classification system (03) may be further processed with suitable technology (magnet, flotation, BSS).

The air classification system (03) may be either a static (ie—cyclone) or a dynamic classification system, or a combination of such devices. Air classification is advantageous as it allows for production of dry streams of ore that contain narrow particle size distributions with control of cut sizes and fineness. In the illustrated embodiment, an air classification system is used to process iron ores allowing the generation of a stream of fine and/or very fine particles. According to an aspect and embodiment, fine particles are produced by modifying different operating parameters of the pneumatic classification system so that a range of top cut sizes and particle size distributions can be obtained. With an air classification system including a dynamic classification wheel and a cyclone, the particle size distribution of the products and their fineness can be controlled by modifying certain variables such as the speed of the classifier wheel, airflow, the rate of material introduced into the classification system and the air-to-solids ratio.

Figure 2:
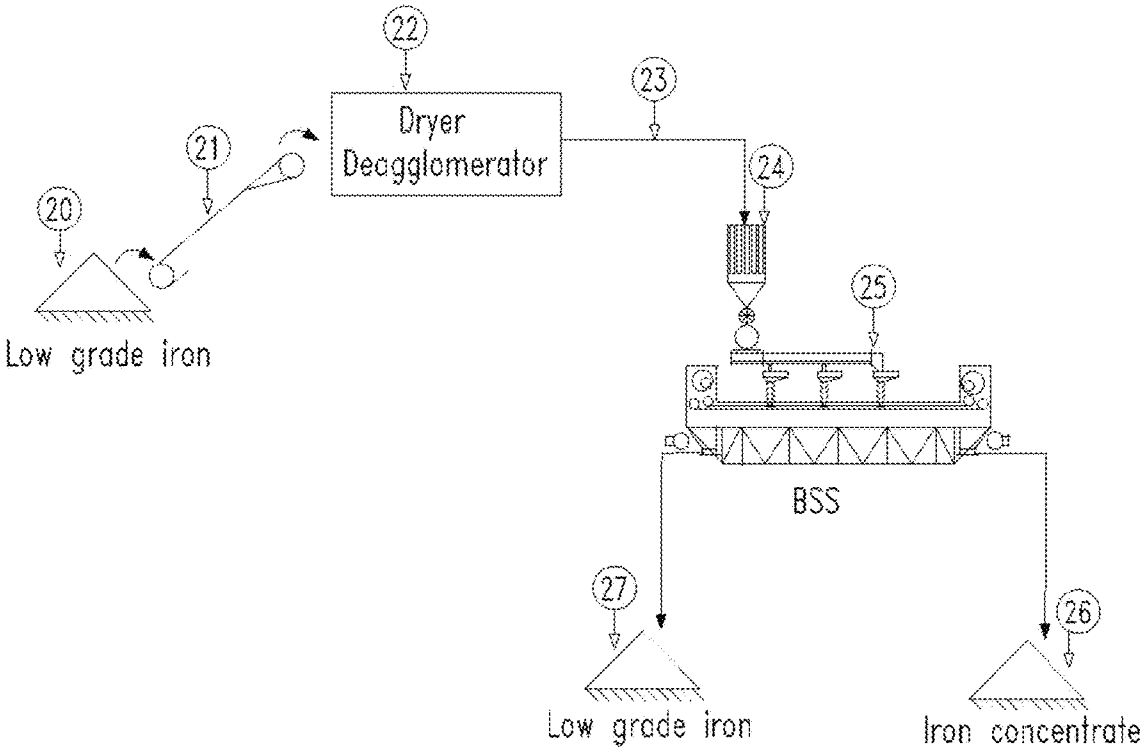
FIG. 2 illustrates a diagram of an embodiment of a system for drying, de-agglomerating, particle size segregation and belt separation where the ore is fractionated into multiple particle size streams.

FIG. 2 illustrates another embodiment of a system and method, wherein the ore is fully dried and de-agglomerated with a dryer (22). The system and process include processing low-grade iron ore natural fines or wastes (20) which are dried and thoroughly de-agglomerated by means of an agitated dryer (22) such as an air swept tubular dryer or other similar flash drying apparatus. The dryer de-agglomerator device (22) reduces the moisture content of the incoming ore, especially in circumstances where the low-grade iron ore has previously been stored as wet tailings or processed by wet methods. The dryer includes a tube and a hot gas generator, which most often will use natural gas or heavy fuel oil as fuel. The hot gas generator dryer operates at temperatures of up to 1050 deg C., with a material exit temperature maintained below 120 deg C. An agitator or agitated dryer is used for de-agglomerating the ore prior to the particle size segregation and electrostatic separation process, as both devices and processes are physical separation processes that are best when the mineral phases are liberated, or physically detached, from each other. The dried iron ore (23) is fed into an electrostatic separation system (25), and specifically a belt separation system (BSS), where the ore is sorted into an iron concentrate fraction (26) and a low grade iron faction (27) which is dry and stackable.

Figure 3:
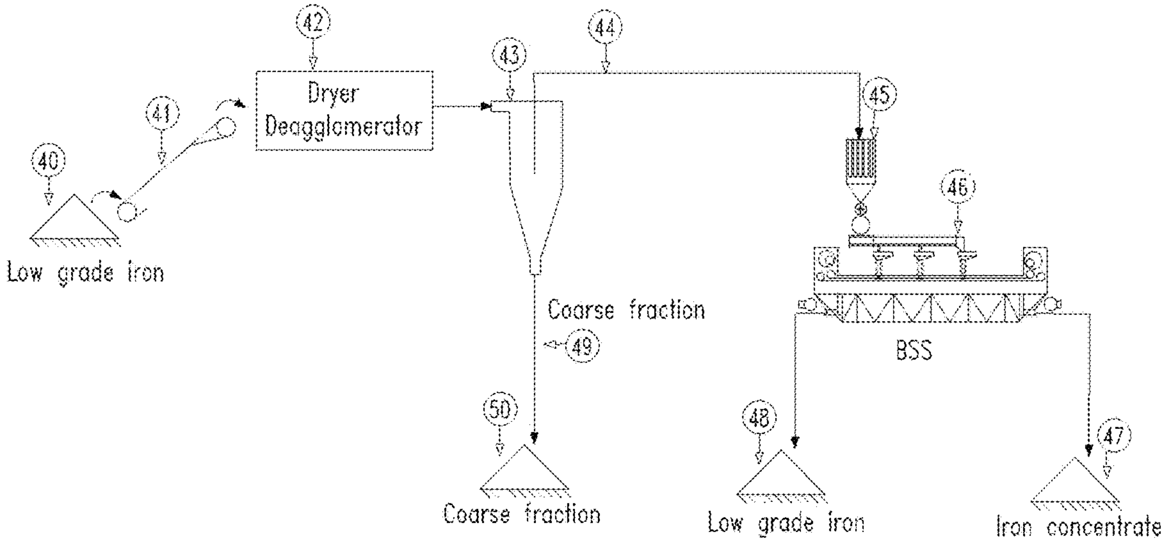
FIG. 3 illustrates a diagram of an embodiment of a system for drying, de-agglomerating, particle size segregation and belt separation of fine and/or very fine iron ore and intermediate sized ores.

FIG. 3 illustrates another embodiment of a system and method, wherein the ore is fully dried and de-agglomerated with a dryer (42) and is split into two particle size fractions, by one air classification system (43). The system and process includes processing low-grade iron ore natural fines or wastes (40) which are then dried and thoroughly de-agglomerated by means of an agitated dryer (42) such as an air swept tubular dryer or other similar flash drying apparatus. The low-grade ore is introduced to a dynamic air classification system, or cyclone system (43) that performs a segregation based on particle size. The fine fraction of the air classifier (which may be comprised of fine and/or very fine iron ore particles) (44) is fed into an electrostatic separation system (46), and specifically a belt separation system (BSS), where the ore is sorted into an iron concentrate fraction (47) and a waste fraction (48) which is dry and stackable.

Figure 4:
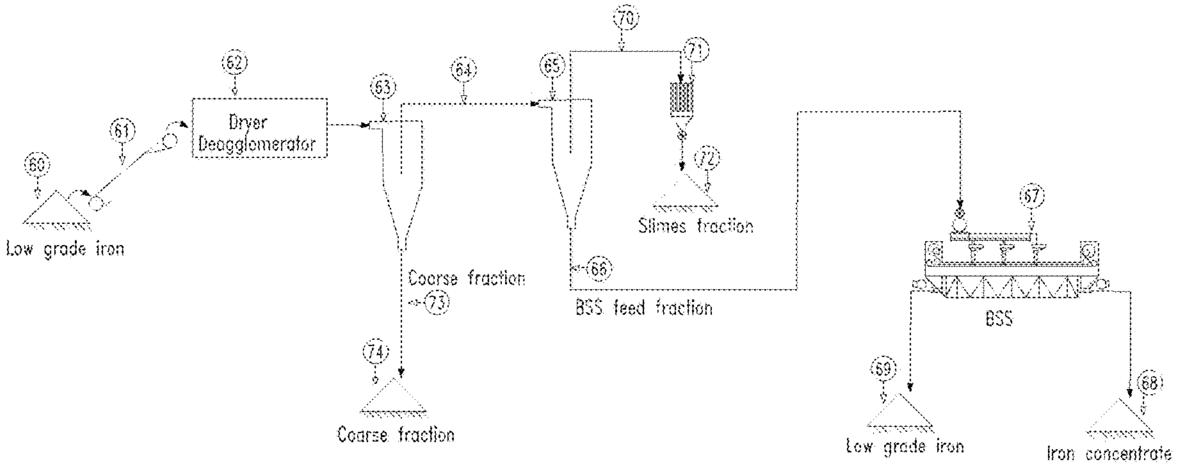
FIG. 4 illustrates another embodiment of a system for drying, de-agglomerating, particle size segregation and belt separation of iron ores.

FIG. 4 illustrates another embodiment of a system and method, wherein the ore is fully dried and de-agglomerated with a dryer (62) and is split into a minimum of three particle size fractions by two or more air classification systems (63,

65). A primary air separator (63) receives the dried output from the dryer and generates a coarser, dry ore stream (73) which may be further processed with suitable technology (magnet, flotation, BSS). The finer material (64) from the primary air classification system (63) is then separated in a secondary air classification system (65) whereby the coarser stream (66), containing a significant fraction of fine and very fine particles is processed by a BSS (67), producing an iron concentrate fraction (68) and a waste fraction (69) which is dry and stackable. The finer material (70) from the secondary air classification system (65) is collected by a fabric filter receiver (71). The dry slimes fraction (72) which is the finest fraction from the secondary classification system (65) collected in a filter receiver (71) is dry tailings which are stackable.

Figure 5:
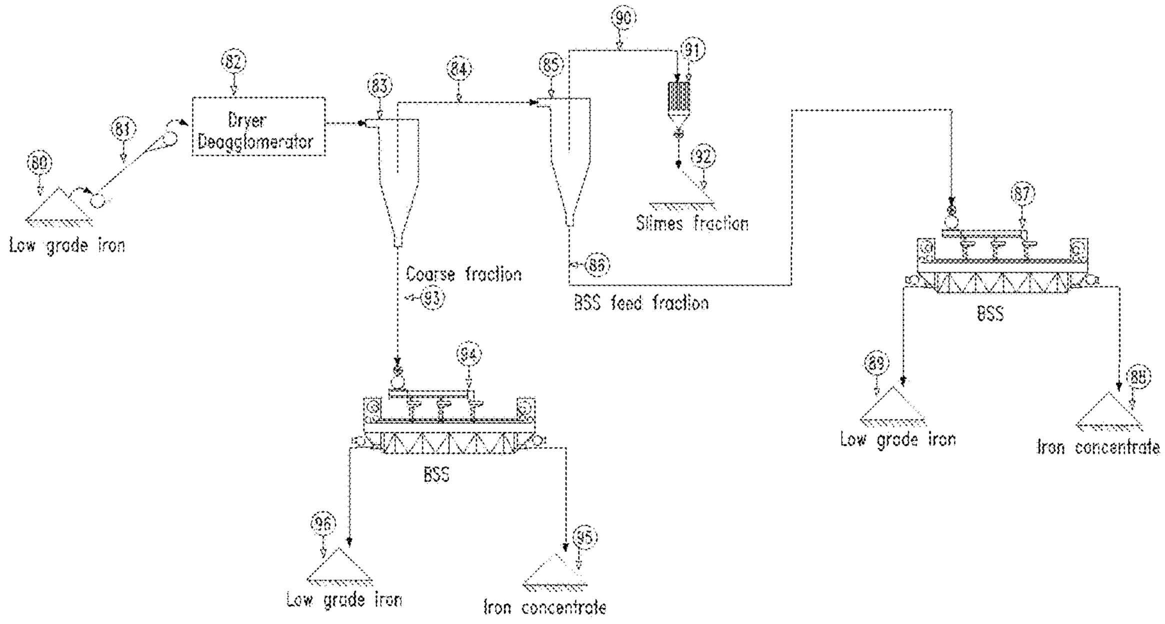
FIGS. 5-9 illustrate other embodiments of a system for drying, de-agglomerating, particle size segregation and belt separation of iron ores.

FIG. 5 illustrates another embodiment of a system and method, wherein the ore is fully dried and de-agglomerated by dryer (82) and is split into a minimum of three particle size fractions, by two or more air classification systems (83, 85). A primary air separator (83) receives the dried output from the dryer and generates a coarser, dry ore stream (93) which may be further processed with a BSS (94). The finer material (84) from the primary air classification system (83) is then separated in a secondary air classification system (85) whereby the coarser stream (86), containing a significant fraction of fine and very fine particles is processed by a BSS (87), where the ore is sorted into an iron concentrate fraction (88) and a waste fraction (89) which is dry and stackable. The finer material (90) from the secondary air classification system (85) is collected by a fabric filter receiver (91). The dry slimes fraction (92) which is the finest fraction from the secondary classification system (85) collected in a filter receiver (91) is dry tailings which are stackable.

Figure 6:
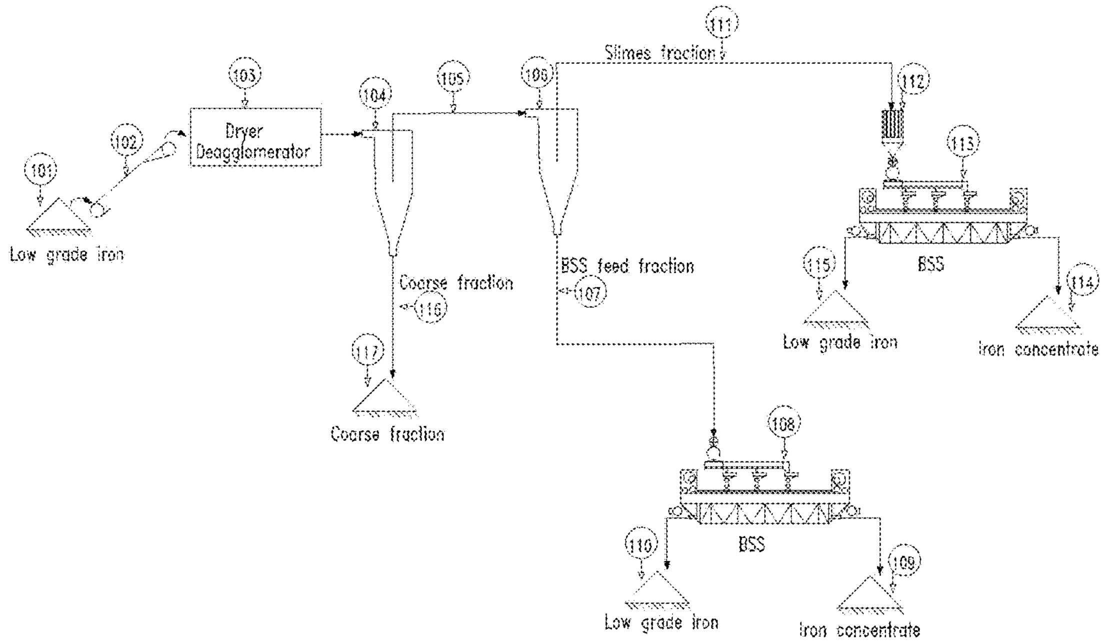

FIG. 6 illustrates another embodiment of a system and method, wherein the ore is fully dried and de-agglomerated by dryer (103) and is split into a minimum of three particle size fractions, by two or more air classification systems (104, 106). A primary air separator (104) receives the dried output from the dryer and generates a coarser, dry ore stream (117) which may be further processed with suitable technology (magnet, flotation, BSS). The finer material (105) from the primary air classification system (104) is then separated in a secondary air classification system (106) whereby the coarser stream (107), containing a significant fraction of fine and very fine particles is processed by a BSS (108), where the ore is sorted into an iron concentrate fraction (109) and a waste fraction (110) which is dry and stackable. The dry slimes fraction (111) which now contains a majority of only clay minerals and iron minerals, is process by another BSS (113), whereby the dry wastes (115) are stackable tailings.

Figure 7:
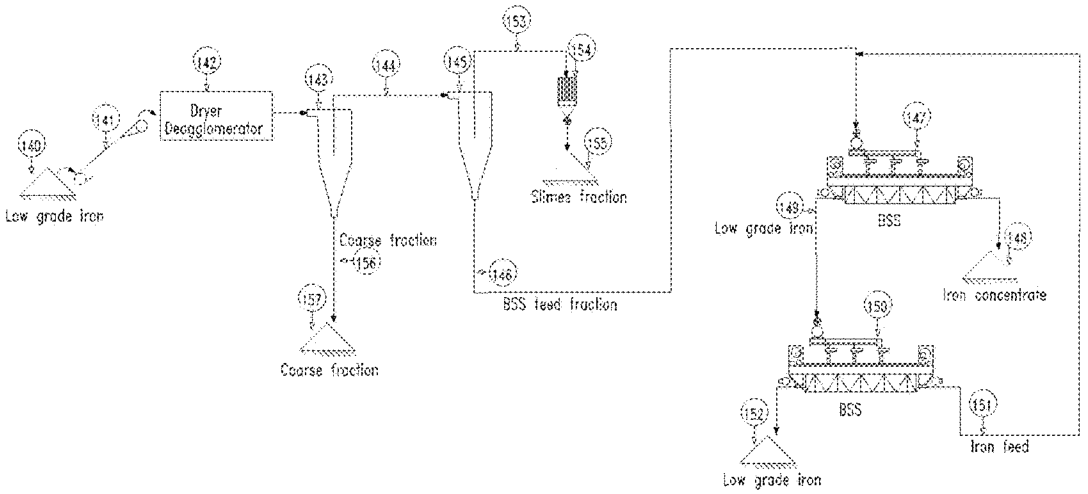

FIG. 7 illustrates another embodiment of a system and method, wherein the ore is fully dried and de-agglomerated with a dryer de-agglomerator system (142) and is split into a minimum of three particle size fractions, by two or more air classification systems (143, 145). A primary air separator (143) receives the dried output from the dryer and generates a coarser, dry ore stream (156) which may be further processed with suitable technology (magnet, flotation, BSS). The finer material (144) from the primary air classification system (143) is then separated in a secondary air classification system (145) whereby the coarser stream (146), containing a significant fraction of fine and very fine particles is processed by a BSS (147). The dry wastes (149) from the primary BSS (147), are processed by a secondary BSS (150) and the product from the BSS (151) is recirculated to the primary BSS (147). The waste fraction from the secondary BSS (150) is dry and stackable. The finer material (153) from the secondary air classification system (145) is collected by a fabric filter receiver (154). The dry slimes fraction (155) which is the finest fraction from the secondary classification system (145) collected in a filter receiver (154) is dry tailings which are stackable.

Figure 8:
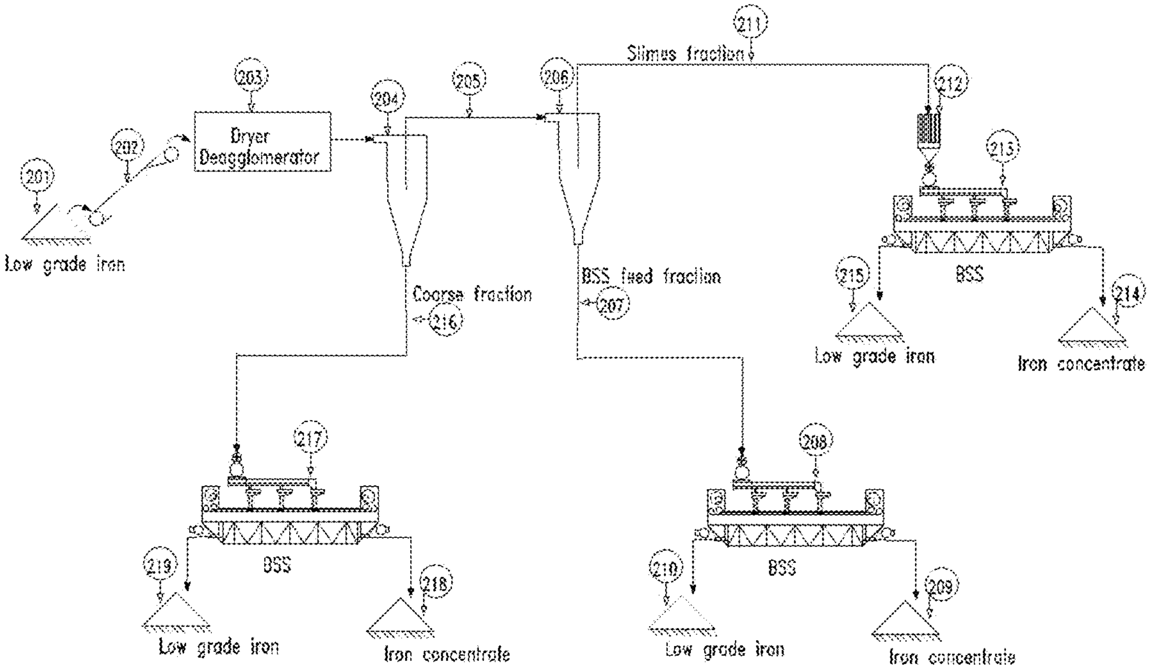

FIG. 8 illustrates another embodiment of a system and method, wherein the ore is fully dried and de-agglomerated by a dryer de-agglomerator system (203) and is split into a minimum of three particle size fractions, by two or more air classification systems (204, 206). A primary air separator (204) receives the dried output from the dryer and generates a coarser, dry ore stream (216) which is further processed with a BSS (217). The finer material (205) from the primary air classification system (204) is then separated in a secondary air classification system (206) whereby the coarser stream (207), containing a significant fraction of fine and very fine particles is processed by a BSS (208), where the ore is sorted into an iron concentrate fraction (209) and a waste fraction (210) which is dry and stackable. The finer material (211) from the secondary air classification system (206) is collected by a fabric filter receiver (212) and is processed by another BSS (213), whereby the dry wastes (215) are stackable tailings.

Figure 9:
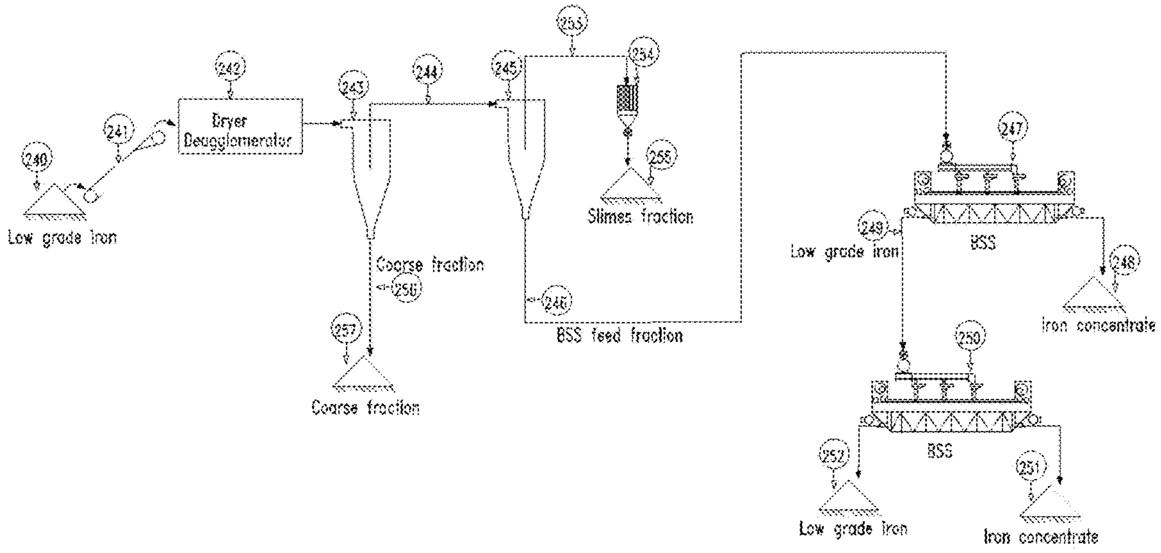

FIG. 9 illustrates another embodiment of a system and method, wherein the ore is fully dried and de-agglomerated with a dryer de-agglomerator system (242) and is split into a minimum of three particle size fractions, by two or more air classification systems (243, 245). A primary air separator (243) receives the dried output from the dryer and generates a coarser, dry ore stream (256) which may be further processed with suitable technology (magnet, flotation, BSS). The finer material (244) from the primary air classification system (243) is then separated in a secondary air classification system (245) whereby the coarser stream (246), containing a significant fraction of fine and very fine particles is processed by a BSS (247). The dry wastes (249) from the primary BSS (247), are processed by a secondary BSS (250) and the product from the secondary BSS (251) is sufficiently high in iron content as to be considered a sellable iron concentrate without additional upgrading. The waste fraction (252) from the secondary BSS (250) is dry and stackable. The finer material (253) from the secondary air classification system (245) is collected by a fabric filter receiver (254). The dry slimes fraction (255) which is the finest fraction from the secondary classification system (245) collected in a filter receiver (254) is dry tailings which are stackable.

PROPHETIC EXAMPLES

To attest the efficiency of the present invention, samples of iron ore were tested using the novel system.

Example 1

In one example, processing of a sample of fine iron ore was completed by an air-classification system followed by a tribo-electrostatic belt separator system. The objective of the study was to demonstrate the efficiency of the system and method in processing very fine iron ores that are otherwise not recoverable by conventional technologies, and in particular not recoverable by conventional dry processing technologies.

The major mineralogical phases of the feed sample are shown in Table 1 below. The sample exhibited a simple mineralogy. The main Fe recoverable mineralogical species in the sample was hematite and the main gangue mineral was present in the form of quartz.

TABLE 1

| Mineral | Chemical Formula | Weight Percent |
|---|---|---|
| Hematite | $Fe_2O_3$ | 68% |
| Goethite | FeO(OH) | 4% |
| Quartz | $SiO_2$ | 24% |
| Kaolinite | $Al_2Si_2O_5(OH)_4$ | 2% |
| Other | — | 2% |

The said iron ore samples were processed using the novel air classification system and belt separator system at demonstration scale around the specific goal to increase Fe concentration of the very fine iron ore that would otherwise be not recoverable with conventional technologies. The classification system was a dynamic pneumatic classifier with a rotor speed of 4,500 RPM and an air to solids mass ratio of 16.3.

TABLE 2

| | | Particle size by laser diffraction measurement | | | |
|---|---|---|---|---|---|
| | Fe(T) % | D10 (μm) | D50 (μm) | D90 (μm) | D98 (μm) |
| Classifier Inlet | 54.7 | 8 | 46 | 165 | 301 |
| Classifier Underflow | 54.4 | 28 | 65 | 179 | 393 |
| Fine Fraction | 55.2 | 3 | 15 | 33 | 44 |

The fine fraction was generated with a D50=15 micron and a D90=33 micron, which is significantly finer than the particle size in which conventional iron ore processing technologies are effective. Because the fine particle size of the ore would make it unsuitable for other processing technologies, any concentrate that is produced has been diverted from the waste stream, and thus avoids the necessity of disposing of it in a tailings dam or pile.

TABLE 3

| BSS of fine fraction (d50 = 15 micron) | | | |
|---|---|---|---|
| | Weight % | % Fe | Fe Recovery % |
| Feed | 100 | 55.2 | — |
| Concentrate | 61.9 | 65.7 | 73.6 |
| Tailings | 38.1 | 38.2 | 26.4 |

The classifier underflow fraction was measured to have a D50=65 micron, which may be processed with a BSS. In this example, the classifier underflow fraction was also processed with the BSS.

TABLE 4

| BSS of classifier underflow fraction (d50 = 65 micron) | | | |
|---|---|---|---|
| | Weight % | % Fe | Fe Recovery % |
| Feed | 100 | 54.4 | — |
| Concentrate | 74.0 | 67.9 | 92.4 |
| Tailings | 26.0 | 15.9 | 7.6 |

Thus the example demonstrates that the pre-processing steps of drying, de-agglomerations and critically air classification improved the selectivity of separation for the classifier underflow fraction, while simultaneously allowing for a +65% high grade iron ore concentrate to be generated from the d50=15 μm fraction. Crucially, the BSS does not produce a middlings fraction, instead providing a concentrate which is directly sellable, and a tailings fraction which is dry and thus stackable.

Example 2

In another example, processing of a sample of fine iron ore was completed after a series of air classification stages.

TABLE 5

| Mineral | Chemical Formula | Weight Percent |
|---|---|---|
| Hematite | $Fe_2O_3$ | 48% |
| Goethite | FeO(OH) | 29% |
| Kaolinite | $Al_2Si_2O_5(OH)_4$ | 3% |
| Quartz | $SiO_2$ | 20% |

The material was air classified across multiple air classifier stages, with the finer fraction fed to the BSS.

TABLE 6

| | | Particle size by laser diffraction measurement | | | |
|---|---|---|---|---|---|
| | Fe(T) | D10 (μm) | D50 (μm) | D90 (μm) | D98 (μm) |
| Fine Fraction | 53.4 | 2 | 7 | 16 | 22 |

The fine fraction which was processed by the BSS has a D50=7 micron and a D90=16 micron, which is significantly lower than the particle size in which conventional iron ore processing technologies are effective.

TABLE 7

| BSS of fine fraction (D50 = 7 micron) | | | |
|---|---|---|---|
| | Weight % | % Fe | Fe Recovery % |
| Feed | 100 | 53.4 | — |
| Concentrate | 56.6 | 62.3 | 66.1 |
| Tailings | 43.4 | 41.7 | 33.9 |

Example 3

In one example, processing of a sample of a fine iron ore was completed by an air-classification system followed by a tribo-electrostatic belt separator system.

The said iron ore samples were processed using the novel air classification system and belt separator system at demonstration scale around the specific goal to increase Fe concentration of the very fine iron ore that would otherwise be not recoverable with conventional technologies. Processing using the belt separator system was also performed on the classifier inlet to demonstrate the effect of air classification on BSS separation. The classification system was a dynamic pneumatic classifier with a rotor speed of 10,000 RPM.

TABLE 8

| | Particle size by laser diffraction measurement | | | | |
|---|---|---|---|---|---|
| | Fe(T) % | D10 (μm) | D50 (μm) | D90 (μm) | D98 (μm) |
| Classifier Inlet | 43.3 | 1 | 5 | 39 | 61 |
| De-slimed Fraction | 42.9 | 6 | 28 | 87 | 128 |
| Slimes Fraction | 51.7 | 1 | 3 | 8 | 11 |

The classifier inlet processed by the BSS has a D50=5 micron and a D90=39 micron, which is significantly lower than the particle size in which conventional iron ore processing technologies are effective.

TABLE 9

| BSS of classifier inlet (D50 = 5 micron) | | | |
|---|---|---|---|
| | Weight % | % Fe | Fe Recovery % |
| Feed | 100 | 43.3 | — |
| Concentrate | 47.9 | 55.8 | 61.8 |
| Tailings | 52.1 | 31.8 | 38.2 |

The fine fraction was generated with a D50=3 micron and a D90=8 micron and has an elevated content of clays which is known to degrade the performance of iron ore concentrators, including BSS. The fine fraction was discarded as slimes.

The de-slimed fraction was measured to have a D50=28 micron, and thus contains significant amounts of iron rich material in the <20 micron range in which conventional iron ore processing technologies are not effective.

TABLE 10

| BSS of de-slimed fraction (d50 = 28 micron) | | | |
|---|---|---|---|
| | Weight % | % Fe | Fe Recovery % |
| Feed | 100 | 42.9 | — |
| Concentrate | 60.0 | 59.9 | 83.9 |
| Tailings | 40.0 | 17.3 | 16.1 |

Thus, the example demonstrates that the pre-processing steps of drying, de-agglomeration and air classification improved the selectivity of separation for the de-slimed fraction, allowing for a +58% high grade iron ore concentrate to be generated from the de-slimed d50=28 μm fraction.

Example 4

In another example, processing of a sample of fine iron ore was completed by a tribo-electrostatic belt separator system.

The major mineralogical phases of the feed sample are shown in Table 11 below. The sample exhibited a simple mineralogy. The main Fe recoverable mineralogical species in the sample were hematite and goethite and the main gangue mineral was present in the form of quartz.

TABLE 11

| Mineral | Chemical Formula | Weight Percent |
|---|---|---|
| Hematite | Fe2O3 | 36 |
| Goethite | FeO(OH) | 14 |
| Kaolinite | Al2Si2O5(OH)4 | 6 |
| Quartz | SiO2 | 40 |
| Gibbsite | Al(OH)3 | 2 |
| Other | — | 2 |

TABLE 12

| Particle size by laser diffraction measurement | | | | |
|---|---|---|---|---|
| Fe(T) | D10 (μm) | D50 (μm) | D90 (μm) | D98 (μm) |
| 37.6 | 5 | 23 | 59 | 93 |

The sample processed by the BSS has a D50=23 micron and a D90=59 micron, and thus contains significant amounts of iron rich material in the <20 micron range in which conventional iron ore processing technologies are not effective.

TABLE 13

| BSS of sample (D50 = 23 micron) | | | |
|---|---|---|---|
| | Weight % | % Fe | Fe Recovery % |
| Feed | 100 | 37.6 | — |
| Concentrate | 31.6 | 60.5 | 50.8 |
| Tailings | 68.4 | 27.1 | 49.2 |

Thus, the example demonstrates that the pre-processing steps of drying and de-agglomerations followed by BSS separation allows for a +60% high grade iron ore concentrate to be generated from a d50=23 μm sample.

Example 5

In another example, processing of a sample of iron ore containing a significant amount of carbonates was completed by a tribo-electrostatic belt separator system.

The major mineralogical phases of the feed sample are shown in Table 14 below. The sample contained a significant number of carbonates, (example: dolomite). The main Fe recoverable mineralogical species in the sample was hematite and the main gangue minerals were present in the form of quartz and carbonates.

TABLE 14

| Mineral | Chemical Formula | Weight Percent |
|---|---|---|
| Hematite | Fe2O3 | 57 |
| Goethite | FeO(OH) | 5 |
| Magnetite | Fe3O4 | 1 |
| Kaolinite | Al2Si2O5(OH)4 | 2 |
| Quartz | SiO2 | 28 |
| Carbonates | — | 7 |

TABLE 15

| Fe(T) | Particle size by laser diffraction measurement D10 (μm) | D50 (μm) | D90 (μm) | D98 (μm) |
|---|---|---|---|---|
| 44.6 | 17 | 62 | 165 | 266 |

The sample processed by the BSS has a D50=62 micron and a D90=165 micron, which may be processed with a BSS.

TABLE 16

| BSS of sample (D50 = 62 micron) | Weight % | % Fe | Fe Recovery % |
|---|---|---|---|
| Feed | 100 | 44.6 | — |
| Concentrate | 62.9 | 60.4 | 85.1 |
| Tailings | 37.1 | 17.9 | 14.9 |

Thus, the example demonstrates that the pre-processing steps of drying and de-agglomerations followed by BSS separation allows for a +60% high grade iron ore concentrate to be generated from a d50=62 μm sample containing carbonates.

Having thus described certain embodiments of a system for beneficiation of very fine iron ore; various alterations, modifications and improvements will be apparent to those of ordinary skill in the art. Such alterations, variations and improvements are intended to be within the spirit and scope of the application. Accordingly, the foregoing description is by way of example and is not intended to be limiting. The application is limited only as defined in the following claims and the equivalents thereto.

What is claimed is:

1. A method for beneficiation of fine and very fine particles of iron ore, comprising:

a. receiving a feed stream of particles and drying the feed stream of particles to provide a particle stream with a moisture of less than 2%; imparting an electrical charge via interparticle friction to the particle stream to provide positive and negative electrically charged components of the particle stream;

b. applying an electric field to the electrically charged components of the particle stream; and c. separating the electrically charged components of the particle stream with the electric field to generate an iron rich concentrate;

wherein the imparting, applying, and separating are electrostatic separation carried out without adding water and in a dry metallurgical route.

2. The method of claim 1, wherein further comprising air classifying the dried feed stream.

3. The method of claim 2, further comprising collecting an enriched fraction of clay minerals in a fabric filter.

4. The method of claim 3, wherein a coarser fraction of the feed stream is separated by electrostatic separation to provide a fine fraction the feed stream.

5. The method of claim 3, wherein a fine fraction of the feed stream is processed by a electrostatic separation to recover iron minerals, and in which a coarser fraction of the feed stream is processed with electrostatic separation.

6. The method of claim 3, wherein low-grade iron rejects from a first electrostatic separation are processed by a secondary electrostatic separation in a scavenging configuration in which the iron rich product from the secondary electrostatic separation is returned as feed to the first electrostatic separation.

7. The method of claim 3, wherein a fine fraction is processed by a first electrostatic separation to recover iron minerals and in which the coarser fraction is processed with a second electrostatic separation.

8. The method of claim 3, wherein low-grade iron rejects from a first electrostatic separation are processed by a second electrostatic separation in a scavenging configuration in which the iron rich product from the second electrostatic separation is sufficiently high in iron content as to be considered a sellable iron concentrate without additional upgrading.

9. The method of claim 1, wherein the feed stream of particles has a median particle size (d50) of 70 μm or less.

10. The method of claim 1, wherein the feed stream of particles has a median particle size (d50) of 50 μm or less.

11. The method of claim 1, wherein the feed stream of particles has a median particle size (d50) of 25 μm or less.

12. The method of claim 1, wherein the feed stream of particles has a median particle size (d50) of 10 μm or less.

13. The method of claim 1, wherein the iron ore comprises one or more of hematite, goethite and magnetite, in varying proportions.

14. The method of claim 1, in which the iron ore is associated with gangue minerals selected from the group including but not limited to: quartz, kaolinite, gibbsite and carbonates.

15. The method of claim 1, wherein the iron ore comprises additional iron minerals including siderite and/or lepidocrocite.

16. A system for beneficiation of fine and very fine particles of iron ore, comprising:

a. a dryer and de-agglomeration system that receives a feed stream of particles and processes the feed stream of particles to provide a particle stream with a moisture of less than 2%; and b. a first triboelectric electrostatic belt separator (BSS) which receives and processes the particle stream with a moisture of less than 2% to generate an iron rich concentrate;

wherein the system and processing is carried out without adding water and in a dry metallurgical route.

17. The system of claim 16, wherein the system further comprises a first air classification device downstream of the dryer and de-agglomeration system and upstream of the first BSS.

18. The system of claim 17, wherein the system further comprises one or more further air classification devices, and in which a finest fraction of material from a final air classification device of the one or more further air classification devices contains an enriched fraction of clay minerals which is collected in a fabric filter.

19. The system of claim 17, wherein a coarser fraction(s) from one or more of the further air classification devices preceding the final air classification device is processed with a second BSS.

20. The system of claim 17, wherein a fine fraction is processed by a second BSS to recover iron minerals, and in which a coarser fraction(s) from one or more of the further air classification devices is processed with a third BSS.

21. The system of claim 17, wherein a low-grade iron rejects from the first BSS are processed by a second BSS in a scavenging configuration in which the iron rich product from the second BSS is returned as feed to the first BSS.

22. The system of claim 17, wherein a fine fraction is processed by the first BSS to recover iron minerals; and in which the coarser fraction(s) from one or more of the further air classification devices is processed with a second BSS.

23. The system of claim 17, wherein low-grade iron rejects from the first BSS are processed by a second BSS in a scavenging configuration in which the iron rich product from the second BSS is sufficiently high in iron content as to be considered a sellable iron concentrate without additional upgrading.

24. The system of claim 16, wherein the first BSS receives and processes a stream of particles having a median particle size (d50) of 70 μm or less.

25. The system of claim 16, wherein the first BSS receives and processes a stream of particles having a median particle size (d50) of 50 μm or less.

26. The system of claim 16, wherein the first BSS receives and processes a stream of particles having a median particle size (d50) of 25 μm or less.

27. The system of claim 16, wherein the first BSS receives and processes a stream of particles having a median particle size (d50) of 10 μm or less.

* * * * *